(12) United States Patent
Dasari et al.

(10) Patent No.: US 10,764,290 B2
(45) Date of Patent: Sep. 1, 2020

(54) GOVERNED ACCESS TO RPA BOTS

(71) Applicant: ACCENTURE GLOBAL SOLUTIONS LIMITED, Dublin (IE)

(72) Inventors: Krishna Mohan Dasari, Frisco, TX (US); Rexall E. Thexton, Branchburg, NJ (US); Ryan Talbert, Los Angeles, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 271 days.

(21) Appl. No.: 16/110,706

(22) Filed: Aug. 23, 2018

(65) Prior Publication Data

US 2020/0067923 A1 Feb. 27, 2020

(51) Int. Cl.
*H04L 29/06* (2006.01)
*G06F 21/45* (2013.01)

(52) U.S. Cl.
CPC .............. *H04L 63/10* (2013.01); *G06F 21/45* (2013.01); *H04L 63/083* (2013.01)

(58) Field of Classification Search
CPC ....... H04L 63/10; H04L 63/083; G06F 21/45; G06Q 10/00
See application file for complete search history.

(56) References Cited

U.S. PATENT DOCUMENTS

| | | | | |
|---|---|---|---|---|
| 9,646,454 B1 * | 5/2017 | Kerr | ...................... | H04W 4/029 |
| 9,817,967 B1 | 11/2017 | Shukla et al. | | |
| 10,324,467 B1 * | 6/2019 | Abeloe | ................ | G08G 5/0086 |
| 10,558,505 B2 * | 2/2020 | Segal | .................... | G06Q 10/109 |
| 10,691,133 B1 * | 6/2020 | Abeloe | ................ | G06N 3/0445 |
| 2007/0186106 A1 * | 8/2007 | Ting | .................... | H04L 63/0815 713/168 |
| 2011/0239293 A1 * | 9/2011 | Perumal | ................ | G06F 21/552 726/21 |
| 2015/0026760 A1 * | 1/2015 | Lipman | ............... | G06F 21/6218 726/1 |
| 2016/0057168 A1 * | 2/2016 | Reddock | ............. | H04L 63/0263 726/1 |
| 2018/0096157 A1 * | 4/2018 | Israel | ...................... | H04L 67/22 |
| 2018/0241881 A1 * | 8/2018 | Li | ......................... | G06Q 30/016 |
| 2018/0293116 A1 * | 10/2018 | Segal | ...................... | G06Q 10/06 |
| 2019/0124114 A1 * | 4/2019 | Purushothaman | ...... | H04L 43/08 |

FOREIGN PATENT DOCUMENTS

WO 2018/017214 A1 1/2018

* cited by examiner

*Primary Examiner* — Cheng-Feng Huang

(57) ABSTRACT

Examples of granting governed privileged access to a robotic process automation (RPA) bot are described. In an example embodiment, for the RPA bot, an onboarding request is received for creating an RPA bot ID. The onboarding request is validated and, in response to the validation, the RPA bot ID is created. A directory service account, a privileged account available for bot employee type, is associated with the RPA bot ID and a target account is linked with the RPA bot ID to provision authorized privileged access of the target account to the RPA bot. An application programming interface (API) is provided for the RPA bot for reconciling the access to the target account. Furthermore, authorized privileged access to the RPA bot is granted to the target account.

16 Claims, 6 Drawing Sheets

GOVERNED ACCESS TO RPA BOTS

BACKGROUND

With the advancement in automation and, more recently, in Artificial Intelligence (AI), human labor is being replaced by machines in almost all industrial sectors. Particularly, recent times have seen use of AI to replace human labor for accurately performing repetitive business tasks at cheap rates. Such automation of business processes, referred to as robotic process automation (RPA) involves the use of AI driven software referred to as RPA bots for achieving high quality of service and delivery at a substantially low cost. Therefore, RPA bots may be AI driven computer software that can be initially trained to repetitively perform certain tasks such as, for example. data entry and data sanity checks.

For example, in case of the business process outsourcing (BPO) industry, the RPA bots can be used to automate various back-office operations, such as automation of data transfer between systems, automating quality assurance, or improving time to serve client requests by automating responses in a customer support setup, or auto-suggesting responses to customer-support agents.

As part of disposing their functions, the RPA bots may, in few cases at least, require to access certain systems in which access to the content is restricted. For example, an entity, such as an individual, a system, an application, or a process, may be permitted to access the content if the entity, either as an individual or as part of a bigger group of members, has been granted privileges to access the content associated with such restricted-access system. One mechanism for providing privileged access to the RPA bots is by the use of an access key or a password provided to the RPA bot for access to a certain kind of content.

For instance, an access provider of the restricted-access system can obtain a request from either a RPA bot or an administrator or a supervisor of the RPA bot. The access provider may run a validation check on the RPA bot and once the requisite validation checks have been performed and cleared by the RPA bot, the RPA bot can be granted an access key to access the restricted-access system and its content. Therefore, in operation, the RPA bot is provided with the access key to restricted-access content on the restricted-access system, and each time the RPA bot is to access that content, the RPA bot can use that access key to obtain access.

However, such an access accorded to the RPA bot may leave the restricted-access content vulnerable to security attacks. For instance, when the RPA bot is provided with the access key for exercising privileged access, the steadfastness of the restricted-access system is as good as the security mechanism of the RPA bot. In other words, if the security mechanism of the RPA bot is compromised and the access key is obtained by an unauthorized entity, such as a rogue RPA bot, then that unauthorized entity automatically gains access to the restricted-access content that was originally accessible to the originally authorized RPA bot. In other words, the security of the restricted-access system is pivoted on a single-breach point, i.e., the access key available with the RPA bot. Therefore, such privileged access provisioned to the RPA bot presents a technical problem of the hazard of making the restricted-access system vulnerable to a security breach, bringing the restricted-access system in a precarious position. This disclosure seeks to address at least the above technical problem in a technical manner.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
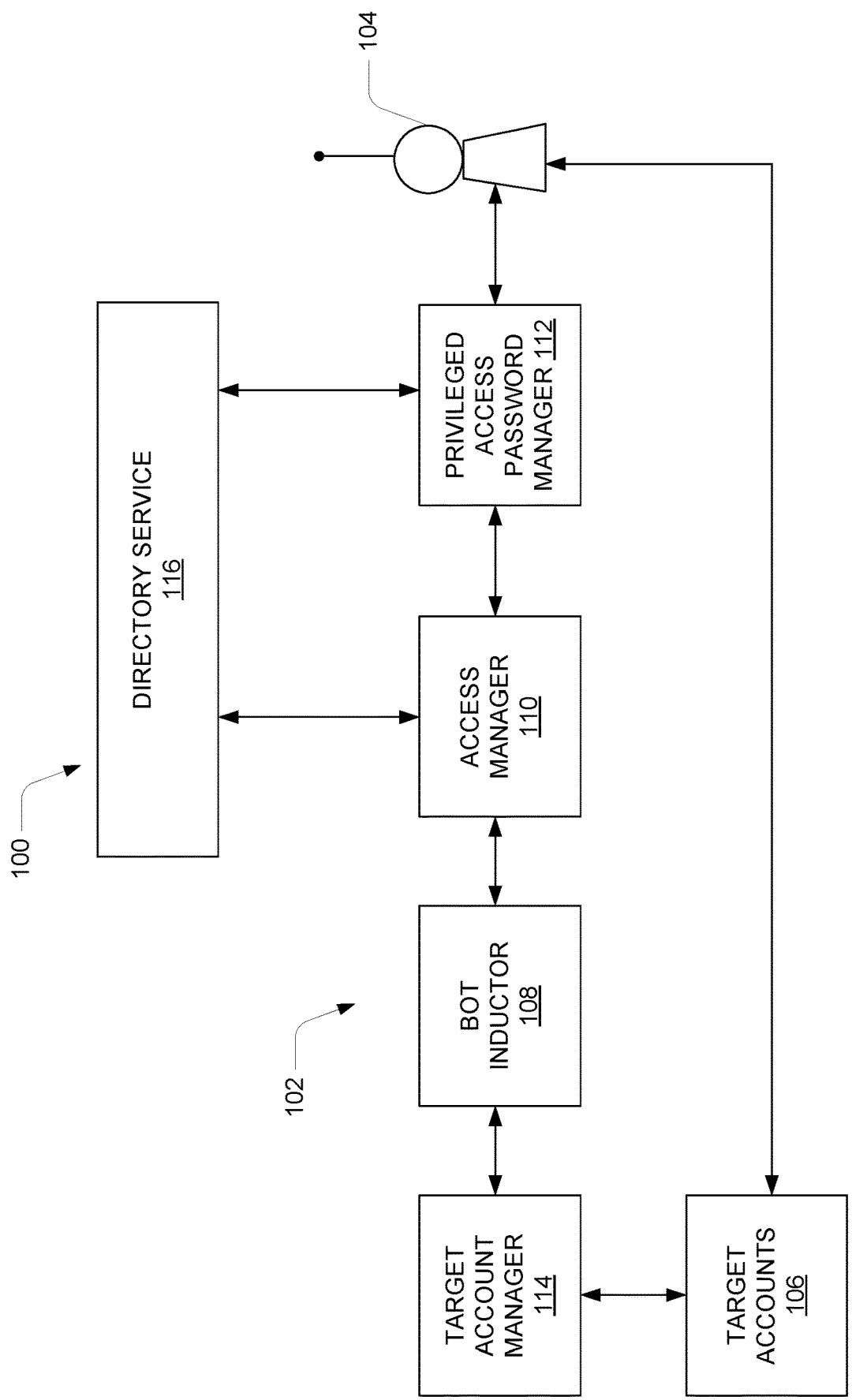
FIG. 1 illustrates a block diagram schematic of a governance framework implementation (GFI) system for governed access to robotic process automation (RPA) bots within a network environment, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on, the term "based upon" means based at least in part upon, and the term "such as" means such as but not limited to.

The present disclosure describes aspects relating to providing governed access to robotic automation process (RPA) bots, for example, to access target systems. RPA bots can be understood as an artificial intelligence-based (AI-based) computer software that is initially trained to perform certain tasks, for instance, by observing the task being performed, and subsequent to being trained, is capable of performing the task itself with little or no human intervention. Examples of the tasks may include accessing user accounts, data entry in and out of user accounts, providing intelligent automated responses based on accessible data and other such tasks.

The aspects described in the present disclosure involve creation of an RPA bot account, referred to as an RPA bot ID, having privileged access rights defined for it to access a target account. Therefore, the RPA bot ID is provisioned for privileged access, but the provisioning as well as the access is designed to be secure, similar to the access by a human. For instance, the RPA bot ID can be provided access to high-risk, and error-prone processes, such as data entry and data copying tasks, to automate such processes and enhance accuracy, but the access is provided in a controlled manner by getting approved by the job role owner to ensure that the access is authorized and has low susceptibility to risk of breach.

Accordingly, the interaction of the RPA bot with the target account is supervised and managed through intermediate entities, which perform necessary checks at different levels to ensure that the access is being requested by an authorized RPA bot ID and not by a rogue RPA bot. At the same time, the intermediate entities can deploy techniques to periodically reset and re-established the access to the RPA bot ID to maintain the entire process invulnerable to security breaches.

As an example, from an implementation perspective, to begin with, the creation of the RPA bot ID is performed in response to an onboarding request for onboarding the RPA bot ID from an administrator account, referred to as a supervisor ID with supervisor being an authorized human to make such requests, associated with the RPA bot ID. Before the RPA bot ID is created, the requisite approvals are validated with the supervisor ID. Subsequently, when the RPA bot ID is created, the supervisor is linked to the RPA bot ID. For instance, the supervisor ID can serve as an authorization mechanism which is associated with the RPA bot ID at the time of RPA bot ID creation, and is deployed at the time of access for further ensuring authorized access to the target accounts. For instance, when the RPA bot ID attempts access, an audit event occurs which, among other things, involves a validation to the access by the supervisor ID.

Further, as mentioned previously, the RPA bot ID and the access thereof are integrated with the intermediate entities. The intermediate entities can include, for example, an access manager (AM), a privileged access password manager (PAPM), and a target account manager (TAM). The intermediate entities are capable of interacting and cooperating with each other. In an example, the AM creates a directory service account for the RPA bot ID in a predefined subdivisional organizational unit dedicatedly created for a new-defined employee type, which captures RPA bots as employees. Accordingly, at the time of RPA bot ID creation, the new employee type is defined for the RPA bot ID as a bot employee type. The directory service account in the subdivisional organizational unit is tagged as a privileged account, which automatically makes the RPA bot ID privy to restricted content. Further, in an example, the PAPM can cooperate with the AM to reconcile privileged access when such access is exercised by the RPA bot ID.

In addition, according to an aspect of the disclosure, the PAPM can provide an application programming interface (API) for the RPA bot ID to synchronize the privileged access with the AM. Further, the TAM manages the target account that is to be allowed privileged access by the RPA bots. In the TAM, the RPA bot ID can be associated with one or more target accounts and the TAM is capable of cooperating with the AM and the PAPM to provision authorized privileged access to the target account by the RPA bot ID. In other words, when the RPA bot ID is to access the target accounts, the authorization for the privileged access is provisioned through the AM and the PAPM.

In operation, to access the target account, the RPA bot can interface with the PAPM. In an example, the RPA bot can call the API of the PAPM to obtain the access to the target account through the TAM and the AM. In response to the call, the PAPM can run an audit on the RPA bot ID associated with the RPA bot, in synchronization with the AM, in the manner explained previously. For instance, an access sync link can be formed between the AM and the PAPM, which is invoked by the PAPM to reconcile the access with the AM. Once reconciled, an access key is provided to the RPA bot to access the target account. Subsequently, the RPA bot can access the target account using the access key. In one example, as explained previously, the target account manager can also perform an audit to ensure that no unauthorized access is granted to the target account. In this manner, the intermediate entities form a decentralized access mechanism for affording privileged access to the RPA bot. The decentralization of the access ensures that the access to the privileged data is not concentrated at one node, which otherwise becomes a single point of failure in terms of the breach of security.

Further, the intermediate entities, for example, the AM, the PAP, and the TAM, can also ensure regulatory compliance of the access performed by the RPA bot ID. For instance, in a banking setup, the access to confidential customer information may be controlled by regulations, and in such a case, the RPA bot ID is required to comply with the regulations in order to effectively carry out operations in such a setup. This is done by integrating the regulatory framework with the intermediate entities and building the rules into the intermediate entities at various levels. Accordingly, the present disclosure provides a governance model for RPA bots that ensures multi-fold reliability—firstly, it ensures that the access to the target accounts complies with an authorization protocol, secondly, it ensures that the access meets the regulatory compliance norms, thirdly, implementing controls to not perform two conflicting tasks also called as Segregation of Duties (SoD), and fourthly, it ensures that the target accounts remain invulnerable to security lapses.

FIG. 1 illustrates a network environment 100 implementing a governance framework implementing (GFI) system 102 for providing governed access to a robotic process automation (RPA) bot 104, according to an example embodiment of the present disclosure. In an example embodiment, the GFI system 102 can implement a decentralized privileged access administration that provides an authorization-based privileged access of one or more target accounts 106 to the RPA bot 104. At the same time, the privileged access is provisioned methodically so as to ensure that there are no loopholes for a rogue bot to gain access to the resources and processes, which are otherwise secured, for being accessed by authorized entities only. The GFI system 102 may implement such decentralized privileged access administration by providing a nexus of intermediate entities, which can regulate the privileged access to the target accounts 106 by the RPA bot 104. The intermediate entities of the GFI system 102 include a bot inductor 108, an access manager (AM) 110, a privileged access password manager (PAPM) 112, a target account manager (TAM) 114, and a directory service 116.

In an example, the network environment 100 may be a public network environment, including multiple individual computers, laptops, various servers, such as blade servers, and other computational devices and resources. In another example, the network environment 100 may be a private network environment with a limited number of computing devices, such as individual computers, servers, and laptops.

Further, in an example embodiment, the RPA bot 104, the target accounts 106, and various elements of the GFI system 102, i.e., the bot inductor 108, the AM 110, the PAPM 112, and the TAM 114, can be connected over a network (not shown). The network may be an individual network or a collection of many such individual networks, interconnected with each other and functioning as a single large network, e.g., the Internet or an intranet. The network may be implemented as one of the different types of networks, such as intranet, local area network (LAN), wide area network (WAN), the Internet, and the like. For instance, the network 100 can include other network entities such as modems, routers, switches, hubs, bridges, gateways, and the like (not shown in the figure) which facilitate the communication between the various elements of the GFI system 102, the RPA bot 104, and the target accounts 106. The infrastructure shown in FIG. 1 may be replaced and upgraded simultaneously as the capabilities and technologies evolve or develop, which is to ensure to surpass any existing and potential "bottlenecks" or "edges".

As an example, the target accounts 106 can be implemented as any applications or any type of systems whereby access by any external entity is to be managed, i.e., the access to the target accounts is privileged and unauthorized access is disallowed. For instance, the target accounts 106 may require login credentials or an access key for granting access to a user, such as the RPA bot 104. The target accounts 106 may include different types of applications, such as, for example, a database application, a CRM application, an accounting application, a factory automation application, cloud applications, local applications, and any other application that requires privileged access. For example, the target accounts 106 can include one or more of active directory (AD) service by Microsoft Corporation™, SAP™ Enterprise Resource Planning (ERP) Central Component (SAP ECC™), SAP™ Enterprise Portal (SAP EP™), SAP NetWeaver Portal, Oracle™ Utilities Customer Care and Billing (CC&B™), and Oracle™ Unified Directory (OUD™) service. The TAM 114 can be associated with the target accounts 106, amongst other things, to regulate and validate as to whether the access being requested to the target account 106 is authorized or not.

The RPA bot 104 can be a configurable software-based system set up to perform and control the tasks that are assigned to it, which are otherwise controlled and performed by a human administrator. In an example, the RPA bot 104 can be generated using an RPA robot generation software, such as Blue-Prism™, Automation Anywhere™, UiPath™, or Fusion™ and other components (not shown) As part of generating a RPA bot, the RPA bot 104 may be programmed to execute a particular access management instruction for a particular set of target accounts 106. For example, the RPA bot 104 may be programmed to mimic operations performed by a human, such as accessing a purchase order in an accounting application. For example, to access the accounting application, a system administrator may access a uniform resource locator (URL) for the accounting application via a browser, and be presented with a login page that includes text boxes for entering a login ID and password. A system administrator may enter a login ID and a password for the system administrator in the text boxes to perform the necessary tasks associated with the purchase order on the accounting application. The RPA bot 104 may be programmed to mimic these operations of the system administrator. For example, the RPA bot 104 may enter the URL of the accounting application in the browser to access the login page, and the RPA bot 104 is programmed to enter the login ID and password for accessing the accounting application as a defined user of the accounting application. The RPA bot 104, accordingly, may be programmed to search for a text box having a particular name in the code, such as the Hypertext Markup Language (HTML), of the login page.

In an example, the AM 110 can be implemented as an identity and access management (IAM) system that facilitates the management of electronic identities for various users, such as human users as well as RPA bots, associated with the GFI system 102 and having privileged access to the target accounts 106. The AM 110 may include a central repository of records, such as electronic identities of individuals or users and the associated credentials, for instance, of an organization, which has privileged access to a selected set of target accounts 106 as a group. The central repository may be a database or any other type of data storage system including a data storage device. The identities and credentials of the user may include, for example, attributes of the individuals, such as employee identifier (ID), job title, geographic location, and business unit ID. For example, when the bot inductor 108 brings onboard an RPA bot 104, credentials for the new RPA bot 104 employee are created and stored in the central repository. Further, the AM 110 may include a policy database that stores policies for the organization that may be related to access management. For example, the policies may specify target accounts 106 that the RPA bot 104 is allowed to access based on the role, department, or position. The AM 110 is discussed in further detail later with reference to FIG. 3.

Further, the PAPM 112 provides to secure and automate the process of discovering, managing, and cycling target account 106 passwords in the GFI system 102. According to an aspect, the PAPM 112 may eliminate hard-coded or embedded application access keys otherwise required for accessing the target accounts 106. The PAPM 112, in the example, may provide an application programming interface (API) having a password cache, that the RPA bot 104 can use while attempting to access the target account 106. In an example, the PAPM 112 can be implemented using the BeyondTrust™ Privileged Password Management service or a password management tool by CyberArk™. The PAPM 112 is discussed in further detail later with reference to FIG. 4.

As mentioned above, the GFI system 102 may, in addition, include the directory service 116. The director service 116 may be implemented by a server, such as a domain controller, and can authenticate and authorize the RPA bots 104 attempting to access the target accounts 106 through the intermediate entities, i.e., the bot inductor 108, the AM 110, and the PAPM 112. For instance, the directory service 116 can cooperate with the AM 110 to assign and enforce access and security policies in the policy database, by first checking the kind of user or employee of the organization that is attempting to access the target account 106. In an example, the directory service 116 can be implemented as the Active Directory™ by Microsoft Corporation™.

In an example, the GFI system 102 seeks to grant access to multiple target accounts 106 to a single RPA bot 104. The access keys to the target accounts 106 are managed by the PAPM 112 and are not readily available to the RPA bot 104 at all times. The GFI system 102 further seeks to integrate the directory service account in the directory service 116 associated with the RPA bot 104 with the PAPM 112 to manage the access keys for all the target accounts 106 that are granted access to the RPA bot 104. Therefore, the RPA bot 104 interacts only with the PAPM 112 for retrieval of passwords and for initiating access to the target accounts 106. Therefore, any human personnel or any other entity, such as another RPA bot, in the organization irrespective of the position in the organizational structure, does not have access to the access key provided to the RPA bot 104.

In operation, to begin with, the bot inductor 108 receives an onboarding request for creation of an account for the RPA bot 104 from a requestor such as, for example, a supervisor of the RPA bot 104. For instance, the onboarding request can be received from an administrator account, referred to as a supervisor ID, associated with the RPA bot ID. The bot inductor 108 is discussed in detail with reference to FIG. 2.

Figure 2:
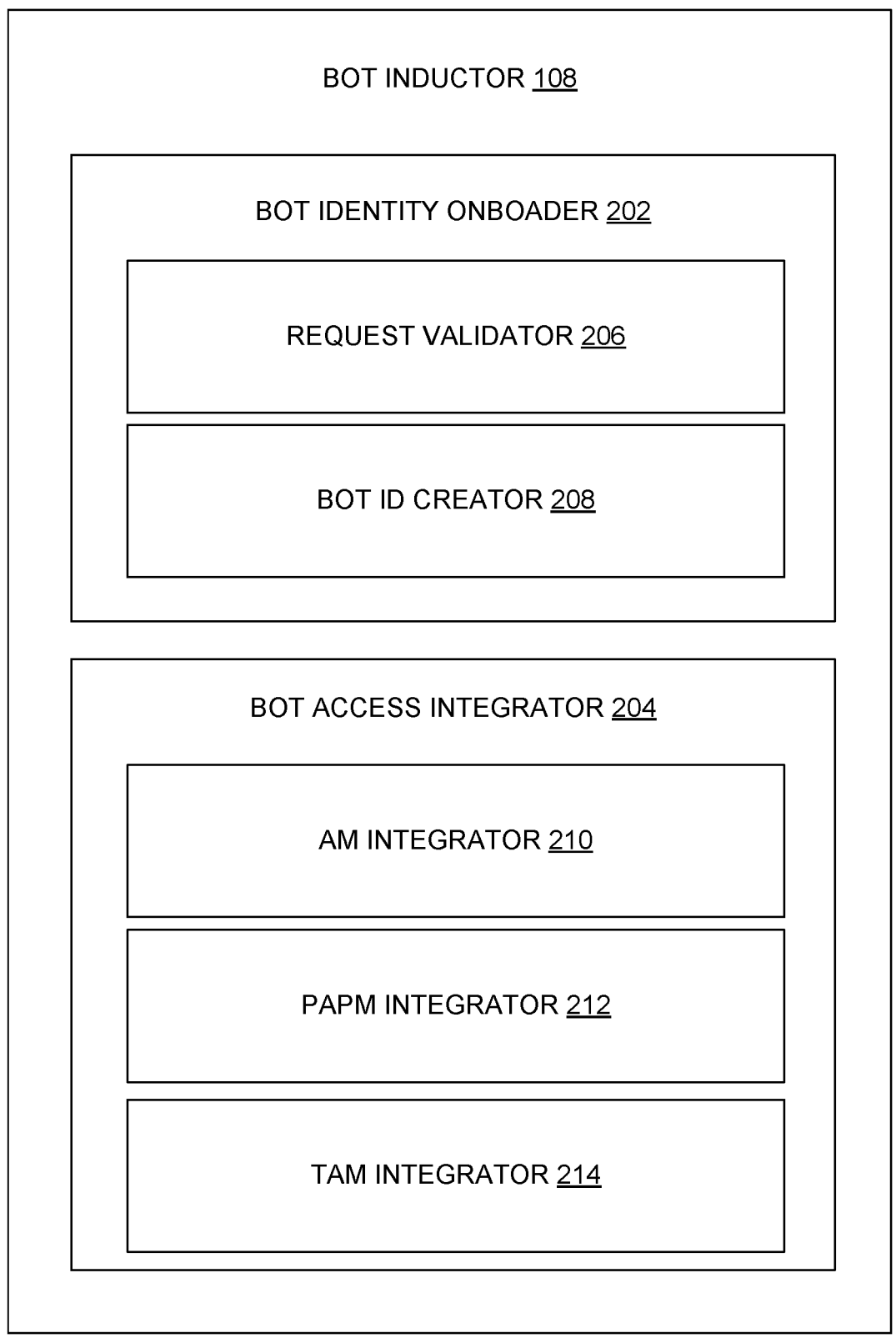
FIG. 2 illustrates a block diagram schematic of a bot inductor of the GFI system according to an example embodiment of the present disclosure.

FIG. 2 illustrates a detailed schematic of the bot inductor 108 of the GFI system 102, according to an example embodiment of the present disclosure. The bot inductor 108 is responsible to inducting the RPA bot 104 onto the GFI system 102 so that the RPA bot 104 can be used for accessing high-risk and error-prone processes, such as data entry and data sanity checks, to automate such processes and enhance the overall accuracy of such processes.

As part of achieving the above function, the bot inductor 108 can include a bot identity onboarder (BIO) 202 to process the onboarding request from the requestor on behalf of the RPA bot 104, and a bot access integrator (BAI) 204 to integrate the RPA bot operationally to the AM 110, the PAPM 112, and the TAM 114, so that the RPA bot 104 can seamlessly exercise its access to target account 106.

Further, for processing the onboarding request, the BIO 202 can further include a request validator 206 for validating the onboarding request for approvals and a bot ID creator 208 to create an RPA bot ID for the RPA bot 104, in response to the onboarding request. In an example, the BIO 202 can provide an interface for the requester to place the onboarding request with the BIO 202. In an example, a requester logs in to the BIO 202, which may for instance be provided as an interface in the form of a chatbot, an Oracle Identity Management (OIM) Self-Reg™, a Saviynt™ user interface, or a customized user interface. Using the interface, the requester can provide certain information regarding the RPA bot 104 in the onboarding request, which is received by the BIO 202. The information can include, for example, a first name associated with the RPA bot 104, a last name associated with the RPA bot 104, a Supervisor Corp ID associated with the RPA bot 104, a process ID associated with the RPA bot 104, a native ID associated with the RPA bot 104, or a combination thereof.

Once the request has been submitted and received by the BIO 202, the request validator 206 can validate the onboarding request, for instance, using the information submitted therein. The request validator 206 can route the onboarding request to pre-configured approvals stages in the bot instructor 108. For instance, the pre-configured approval stage can be a manager of the supervisor of the RPA bot 104, i.e., the manager of the requester, or any other predefined RPA bot owner's approval. If the request validator 206 is unable to validate the request for approvals from the approval stage, the request validator 206 may reject the onboarding request, which terminates the process of inducting and onboarding the RPA bot 104.

On the other hand, if the request validator 206 is able to validate the request for approvals from the approval stage, the request validator 206 may allow the onboarding request. Accordingly, the bot ID creator 208 can, thereby, create the RPA bot ID and induct the RPA bot 104 to the GFI system 102. When the bot ID creator 208 creates the RPA bot ID, the bot ID creator 208 may associate with the RPA bot ID a bot login ID, an organization ID associated with the RPA bot 104, an employee type defined for the RPA bot 104, a personnel number associated with the RPA bot 104, a first name associated with the RPA bot 104, a last name associated with the RPA bot 104, a Supervisor Corp ID associated with the RPA bot 104, or a combination thereof.

For instance, the bot login ID can be of the format BOT login ID=bot<ProcessID><BOTID>. In such a case, the bot ID creator 208 may require that the bot login ID is of 12 characters. In case the characters are fewer than 12, then while creating the bot login ID, the bot ID creator 208 can prefix <BOTID> with zeros. An example of the bot ID created by the bot ID creator 208 is pAIgePOM0001. As an example, the organization ID associated with the RPA bot 104 can be in the format Organization=BOT <ORG>. As an example, the employee type defined for the RPA bot 104 can be in the format Employee Type=BOT. As an example, a personnel number associated to the RPA bot 104 can be in the format Personnel Number=<ProcessID><BotID>. As an example, the first name associated with the RPA bot 104 can be in the format First name=<Provided by the requester> or <defined by RPA bot>. Similarly, the last name associated with the RPA bot 104 can be in the format Last name=<Provided by the requester> or <ProcessID><BOTID>. For instance, the supervisor corp ID associated with the RPA bot 104 can be in the format Supervisor Corp ID=<Supervisor's LANID provided by the requester>. In addition, the access key for the RPA bot ID is generated by the GFI system 102, for example, when the onboarded RPA bot 104 interacts with the GFI system 102 to access the target account 106 or when the existing access key has expired and the RPA bot 104 interacts with the GFI system 102 to access the target account 106. Therefore, the induction and onboarding of the RPA bot 104 does not involve any manual intervention, besides the validation and can be considered fully automated.

Further, as mentioned previously, the bot inductor 108 can include the BAI 204 for integrating the RPA bot ID onboarded by the BIO 202 with the various intermediate entities of the GFI system 102, such as the AM 110, the PAPM 112, the TAM 114, and the directory service 116, to provision privileged access to the target accounts 106 in a methodical manner. In an example, for the purposes of integrating the RPA bot ID with the GFI system 102, the BAI 204 can include an access manager (AM) integrator 210, a privileged access password manager (PAPM) integrator 212, and a target account manager (TAM) integrator 214.

In an example, the AM integrator 201 can provision a directory service account, in the directory service 116, to the RPA bot ID of the onboard RPA bot 104. According to an aspect, the directory service account in the directory service 116, which is provisioned to the RPA bot ID, can be a privileged account available for the bot employee type defined for the RPA bot ID. In other words, the provisioning of the directory service account automatically affords privileged access rights to that RPA bot ID. The PAPM integrator 212 can provision an application programming interface (API) for the RPA bot ID associated with the RPA bot 104 for reconciling the privileged access to the target account 106 with the AM 110. Further, the TAM integrator 214 can associate the target account 106 with the RPA bot ID for the RPA bot 104 to provision authorized privileged access to the target accounts 106. In an example, the TAM integrator 214 can provision the authorization to the RPA bot ID for the privileged access to the target accounts through the AM 110 and the PAPM 112.

In an example, the aspect of integration of the RPA bot ID can be understood as a handover step where the control shifts from the bot inductor 108 to the AM 110, the PAPM 112, and the TAM 114 for provisioning various services, as mentioned above with respect to each of the AM integrator 210, the PAPM integrator 212, and the TAM integrator 214. In other words, in an example, the function performed by the BAI 204 is to transfer the control from the bot inductor 108 to the other components of the GFI system 102, i.e., the AM 110, the PAPM 112, and the TAM 114 for provisioning the RPA bot 104 to access the target accounts 106.

Figure 3:
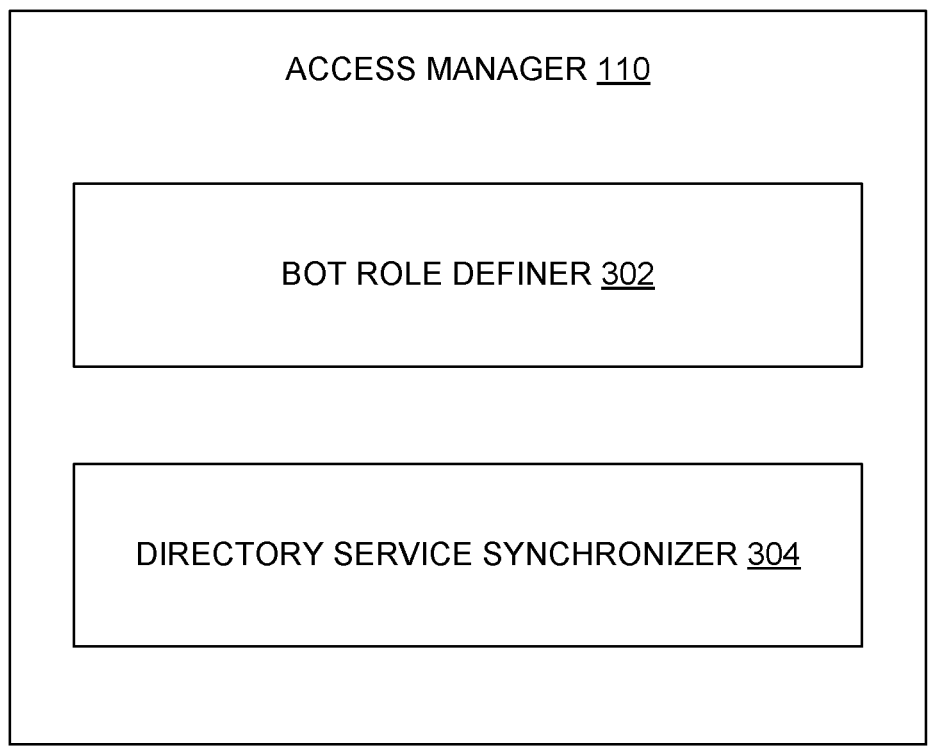
FIG. 3 illustrates a block diagram schematic of an access manager of the GFI system, according to an example embodiment of the present disclosure.

FIG. 3 illustrates a detailed schematic of the access manager (AM) 110, according to an example embodiment of the present disclosure. Once the RPA bot ID is integrated with the AM 110 by the AM integrator 210, the AM 110 can take on the role of provisioning various services with the RPA bot ID. In an example, the AM 110 can include a bot role definer 302 and a directory service synchronizer 304. In the example, the bot role definer 302 can sign a role to the RPA bot ID, the process being referred to as auto-role membership. The role associated with the RPA bot ID can be stored in the policy database in the AM 110.

The directory service synchronizer 304 can automatically associate a directory service account in the directory service 116 with the RPA bot ID, for example, as soon as the RPA bot ID is created and the directory service synchronizer 304 is either informed or determines such an RPA bot ID creation. In other words, the directory service synchronizer 304 can provision birthright access to the RPA bot ID for the directory service account in the directory service 116. As mentioned previously, the directory service account can be provisioned as a privileged access account so as to automatically provision privileged access to the RPA bot 104 having that RPA bot ID. Accordingly, the directory service synchronizer 204 can create the directory service account for the RPA bot ID in a predefined subdivisional organizational unit dedicatedly created for the bot employee type, i.e. for the employee type defined for the RPA bot ID. For example, the RPA bot ID can be provisioned to a subdivisional organization unit, for instance, in the directory service 116, defined as OU=PAPMManagedBotAccounts. As will be understood, the directory service account in the subdivisional organizational unit is tagged and identified as a privileged account, thereby providing privileged access rights to the RPA bot 104 associated with that RPA bot ID.

Figure 4:
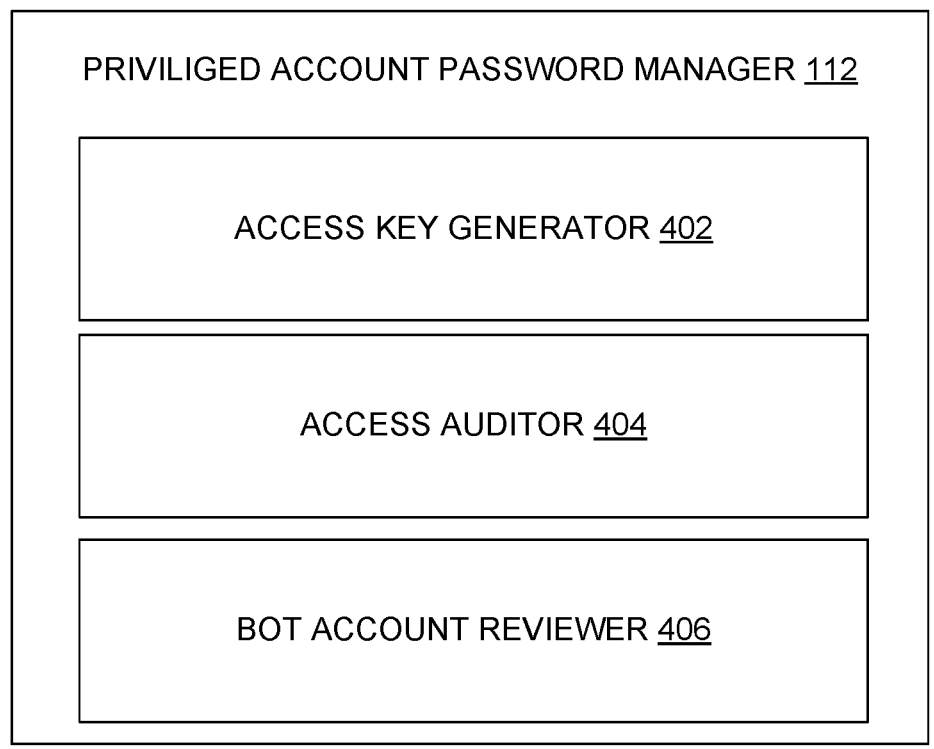
FIG. 4 illustrates a block diagram schematic of a privileged account password manager of the GFI system, according to an example embodiment of the present disclosure.

FIG. 4 illustrates a detailed schematic of the PAPM 112, in accordance with an example embodiment of the present disclosure. The PAPM 112 can detect all the RPA bot IDs associated with the directory service account in the OU=PAPMManagedBotAccounts are detected as privileged account, and for all such RPA bot ID/accounts, the access keys are managed by the PAPM 112 and the access is also reconciled by the PAPM 112.

In an example, the PAPM 112 can include an access key generator 402, an access auditor 404, and a bot account reviewer 406. The access key generator 402 manages the access keys for the RPA bot ID to access the target accounts 106. For instance, to initiate the access to the target accounts 106, the RPA bot 104 can connect to the PAPM programmatically and seeks to retrieve an access key. For example, when the RPA bot 104 connects to the PAPM 112 for the first time after creation of the RPA bot ID, the access key generator 402 can instantaneously generate the access key for providing access to the relevant target account 106 by the RPA bot 104, the target account 106 identified, for example, based on the credentials of the RPA bot 104.

Once the access key generator 402 has generated the access key but before the access key is provided to the RPA bot 104, the access auditor 406 may perform an audit. The audit may include the access auditor 406 assessing access policies associated with the RPA bot 104 attempting the access and determining whether the access should be granted to the RPA bot 104 or not. In addition, when the RPA bot 104 attempts to access the target account 106, a similar audit can be performed by the TAM 114. For instance, the TAM 114 can handle access requests from RPA bot IDs in the same manner as the access requests from IDs of other organizational entities or personnel.

Subsequent to a successful audit, the RPA bot 104 can obtain the access key and access the target account 106 to perform the required tasks. In an example, the RPA bot 104 can store the retrieved access key in a password vault, such as, for example, in a memory or a database associated with the RPA bot 104, and may not require to connect to the PAPM 112 on a regular basis to gain access to the target accounts 106. However, the access key generator 402 may be configured to periodically reset the access key and relay the updated access key across the GFI system 102. This is so done in order to protect the access by an unauthorized entity, that may have hacked the RPA bot 104 and obtained the password that was stored in the password vault.

The access key that is changed by the access key generator 402 is synchronized across the GFI system 102, starting from the PAPM 112, the directory service 116, the AM 110, and the TAM 116. This is particularly advantageous to reconcile the access, because this synchronization is facilitated by the access sync link between the AM 110 and the PAPM 112. In an example, the updated access key is relayed along with a correlation key in the format sAMAccount-Name=Users.User ID to identify the RPA bot ID for which the access key has been updated. Subsequently, when RPA bot 104 experiences an invalid access key exception when attempting to connect to the target account 106, RPA bot 104 may again connect with the PAPM 112 to obtain the access key, after being audited, in the same manner as described earlier.

Further, the bot account reviewer 406 can initiate removal of RPA bot IDs associated with retired or non-functional RPA bots 104. In addition, for existing RPA bot IDs, the bot account reviewer can periodically review access policies associated with each existing RPA bot ID to ensure that the RPA bots 104 associated with the GFI system 102 does not have undue or unnecessary privileges to access the target accounts and the rights provisioned to the RPA bots 104 are on an as-required basis.

Accordingly, based on aspects consistent with the present disclosure, the GFI system 102 is capable of defining a new employee type, i.e., the bot type associated with the RPA bot account/RPA bot ID, and a new organization type, i.e., BOT <ORG> which can be a security construct in the GDI system 102 to enforce controls and regulate access capabilities of the RPA bots 104. The GFI system 102 can grant or provision the RPA bot ID to the directory service account in an automated manner, in a newly defined subdivisional organizational unit, OU=PAPMManagedBotAccounts, dedicated for the employee type defined as bot type. The access policies are predefined for such employee type provisioned birthright access to the directory service account in the subdivisional organization unit as being privileged access. In addition, the GFI system 102 includes provisions for the requester to request additional entitlements for one or more RPA bot IDs, which are subject to approvals from other supervisors higher in the organizational hierarchy. In addition to the above, the relaying of the access key across the GFI system 102 by the PAPM 112 provides seamless integration between the RPA bots 104, the PAPM 112, the directory service 116, the AM 110, the TAM 114, and the target accounts 106. This is facilitated, amongst other things, by setting up of a connector, the access sync link, between the AM 110 and the PAPM 112 to provision the synchronization. In addition, the periodic resetting of the access keys protects the target accounts 106 from unauthorized access.

Figure 5:
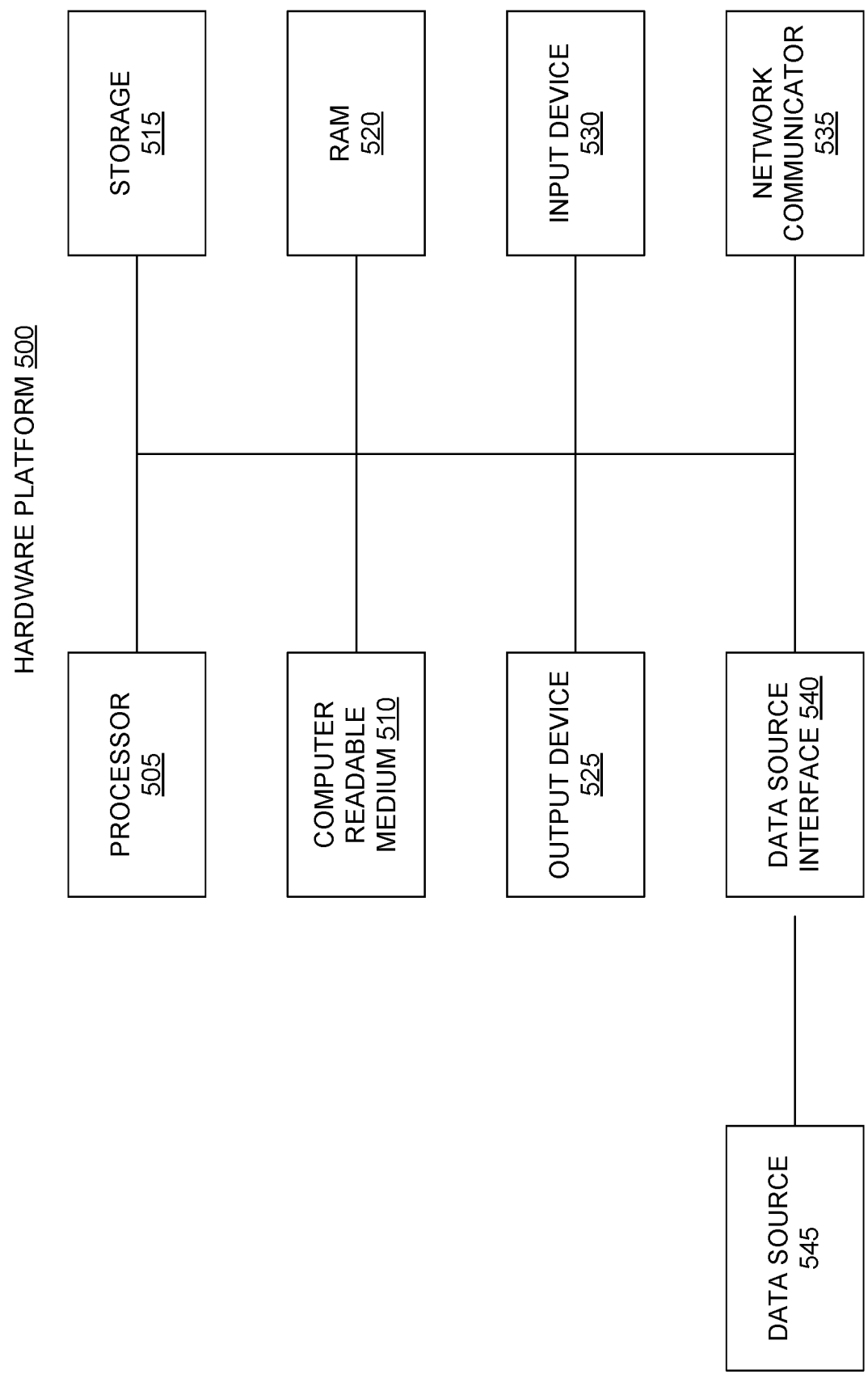
FIG. 5 illustrates a hardware platform for implementation of one or more components of the GFI system, according to an example embodiment of the present disclosure.

FIG. 5 illustrates a hardware platform 500 for implementation of any one of or all of the RPA bot 104, the bot inductor 108, the access manager 110, the privileged access password manager 112, the target account manager 114, the directory service 116, or the target accounts 106, individually as well as collectively referred to as the governance framework component (GFC), according to an example of the present disclosure. Particularly, computing machines such as but not limited to internal/external server clusters, quantum computers, desktops, laptops, smartphones, tablets and wearables which may be used to execute the GFC or may have the structure of the hardware platform 500. The hardware platform 500 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Referring to FIG. 5, the hardware platform 500 may be a computer system 500 that may be used with the examples described herein. The computer system 500 may represent a computational platform that includes components that may be in a server or another computer system. The computer system 500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 500 may include a processor 502 that executes software instructions or code stored on a non-transitory computer readable storage medium 504 to perform methods of the present disclosure. The software code includes, for example, instructions to perform the steps described with reference to the components of the GFC in FIG. 1, FIG. 2, FIG. 3, and FIG. 4 previously. In an example, the BIO 202, the BAI 204, the bot role definer 302, the directory service synchronizer 304, the access key generator 402, the access auditor 404, and the bot account reviewer 406 may be software codes or components performing these steps.

The instructions on the computer readable storage medium 504 are read and stored the instructions in storage 506 or in random access memory (RAM) 508. The storage 506 provides a large space for keeping static data where at least some instructions could be stored for later execution. The stored instructions may be further compiled to generate other representations of the instructions and dynamically stored in the RAM 508. The processor 502 reads instructions from the RAM 508 and performs actions as instructed.

The computer system 500 further includes an output device 510 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 500 further includes input device 512 to provide a user or another device with mechanisms for entering data and/or otherwise interact with the computer system 500. The input device may include, for example, a keyboard, a keypad, a mouse, or a touchscreen. In an example, output of any component of the GFC is displayed on the output device 510. Each of these output devices 510 and input devices 512 could be joined by one or more additional peripherals.

A network communicator 514 may be provided to connect the computer system 500 to a network and in turn to other devices connected to the network including other clients, servers, data stores, and interfaces, for instance. A network communicator 514 may include, for example, a network adapter such as a LAN adapter or a wireless adapter. The computer system 500 includes a data source interface 516 to access data source 516. A data source is an information resource. As an example, a database of exceptions and inferencing rules may be a data source. Moreover, knowledge repositories and curated data may be other examples of data sources.

Figure 6:
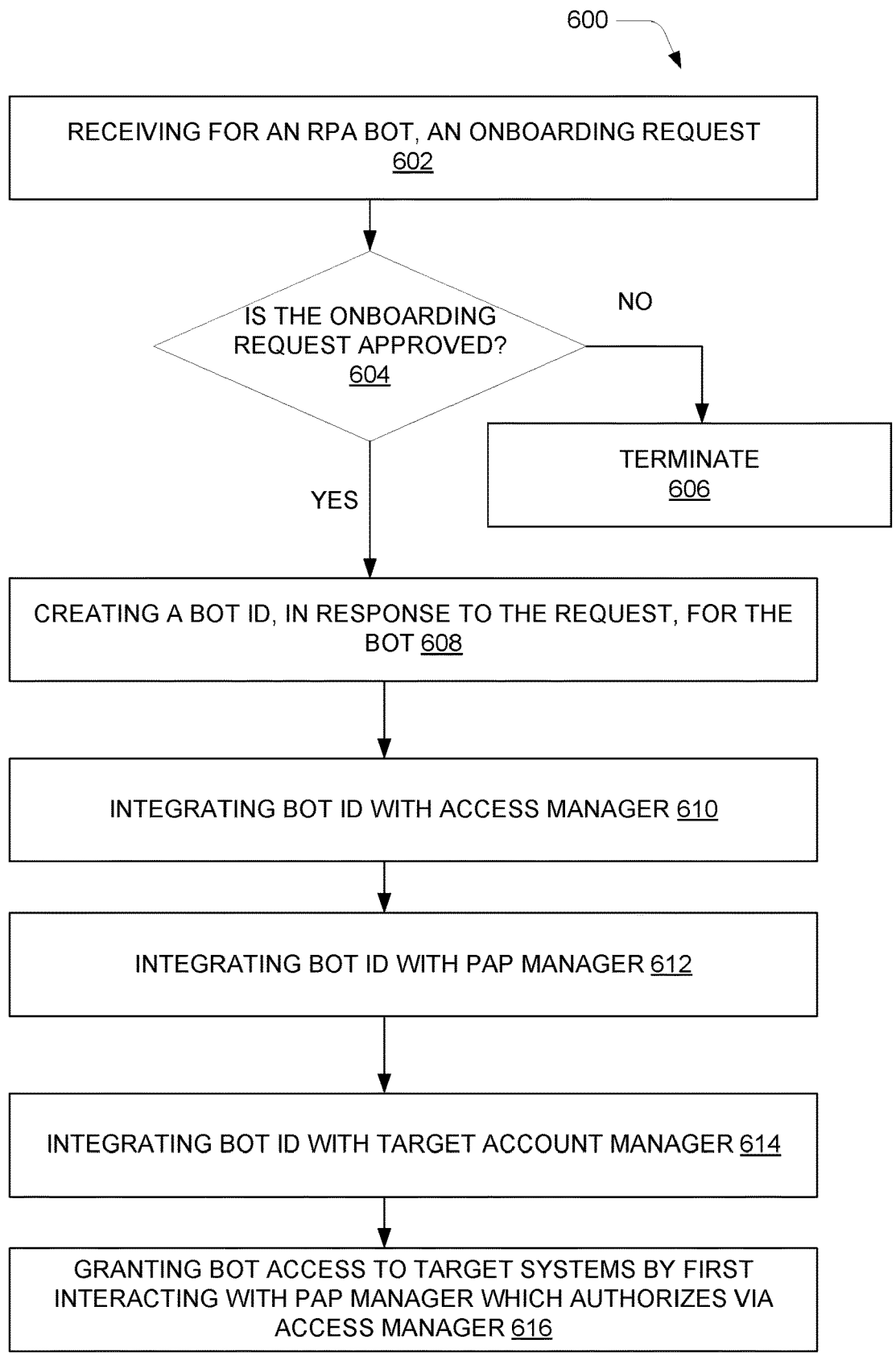
FIG. 6 illustrates a method of providing governed access to the RPA bots, according to an example embodiment of the present disclosure.

FIG. 6 illustrates a method 600 of providing governed access to the RPA bots, according to an example embodiment of the present disclosure.

Referring to the method 600, at block 602, for a robotic process automation bot (RPA) bot 104, an onboarding request is received, for instance, for creating an RPA bot ID.

Further, at block 604, the onboarding request is validated to check whether the onboarding request is approved or not. The onboarding request is validated using the information submitted therein. The onboarding request can be routed to pre-configured approval stages. For instance, the pre-configured approval stage can be a manager of the supervisor of the RPA bot 104, i.e., the manager of the requester, or any other predefined RPA bot owner's approval.

If the onboarding request is not validated (NO path from block 604), then the onboarding request is rejected which terminates the process of inducting and onboarding the RPA bot 104 at block 606.

On the other hand, if the onboarding request is validated and approved (YES path from block 604), then, at block 608, the RPA bot ID is created to induct the RPA bot 104 to the GFI system 102. When the RPA bot ID is created, a bot login ID, an organization ID associated with the RPA bot 104, an employee type defined for the RPA bot 104, a personnel number associated with the RPA bot 104, a first name associated with the RPA bot 104, a last name associated with the RPA bot 104, a Supervisor Corp ID associated with the RPA bot 104, or a combination thereof may be associated with the RPA bot ID.

Subsequently, integration of the RPA bot ID with the components of the GFI system 102 is achieved. In an example, the aspect of integration of the RPA bot ID of the RPA bot 104 can be understood as a handover step where the transfer of control occurs from the bot onboarding process to the other components of the GFI system 102, i.e., the AM 110, the PAPM 112, and the TAM 114 for provisioning the RPA bot 104 to access the target accounts 106.

Accordingly, at block 610, the RPA bot ID is integrated with the AM 110. As part of integration with the AM 110, a directory service account, in the directory service 116, can be provisioned to the RPA bot ID of the onboard RPA bot 104. According to an aspect, the directory service account in the directory service 116, which is provisioned to the RPA bot ID, can be a privileged account available for the BOT employee type defined for the RPA bot ID. In other words, the provisioning of the directory service account automatically affords privileged access rights to that RPA bot ID. Further details regarding the integration of the RPA bot ID with the AM 110 can be understood with reference to the description of FIG. 3.

Further, at block 612, the RPA bot ID is integrated with the PAPM 112. The integration with the PAPM can provision an application programming interface (API) for the RPA bot ID associated with the RPA bot 104 for reconciling the privileged access to the target account 106 with the AM 110. Further details of integration of the RPA bot ID with the PAPM 112 have been provided previously with reference to the description of FIG. 4.

Further at block 614, the RPA bot ID is integrated with the TAM 114. Accordingly, at block 614, the relevant target accounts 106 can be associated with the RPA bot ID for the RPA bot 104 to provision authorized privileged access to the target accounts 106. In an example, as part of integration with the TAM 114, the authorization can be provisioned to the RPA bot ID to exercise privileged access to the target accounts 106 through the AM 110 and the PAPM 112.

Further, at block 616, access is granted to the RPA bot 104 to access the target accounts 106 by first interfacing with the PAPM 112, which reconciles the access with the AM 110, and other components of the GFI 102. Other details of the various blocks of method 600 can be understood with reference to the description of FIGS. 1 to 4.

What has been described and illustrated herein are examples of the present disclosure along with some of its variations. The terms, descriptions and figures used herein are set forth via illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A governance framework implementing system including at least one hardware processor coupled to one or more memory programmed with executable instructions that, when executed by the hardware processor, perform operations comprising:
  a target account manager (TAM) to control access to a target account by a robotic process automation (RPA) bot;
  an access manager (AM) to maintain records relating to the access of the target account and to cooperate with the TAM to control the access based on the records;
  a privileged access password manager (PAPM) to manage access credentials of the RPA bot to provide access to the target account, wherein the PAPM is to perform an audit when the RPA bot attempts to access the target account, the audit comprising assessing access policies associated with the RPA bot attempting access to determine whether to grant access to the RPA bot; and
  a bot inductor comprising,
  a bot identity onboarder (BIO) to receive, for the RPA bot, an onboarding request for creating an RPA bot ID, the BIO comprising,
  a request validator to validate the onboarding request for approvals;
  a bot ID creator to create the RPA bot ID in response to the validation by the request validator; and
  a bot access integrator (BAI) to integrate the RPA bot ID to the AM, the PAPM, and the TAM, to grant privileged access to the RPA bot ID to the target account, the bot access integrator comprising:
  an access manager (AM) integrator to provision a directory service account to the RPA bot ID, the directory service account being a privileged account available for bot employee type, wherein the AM is to create the directory service account for the RPA bot ID in a predefined subdivisions/organizational unit dedicatedly created for the bot employee type, the directory service account in the subdivisional organizational unit being tagged as the privileged account;
  a privileged access password manager (PAPM) integrator to provision an application programming interface (API) for the RPA bot for reconciling the privileged access to the target account with the access manager; and
  a target account manager (TAM) integrator to associate the target account with the RPA bot ID to provision authorized privileged access to the target account, the authorization for the privileged access provisioned through the access manager and the privileged access password manager.

2. The governance framework implementing system as claimed in claim 1, wherein the BIO is to receive in the onboarding request at least one of a bot first name, a bot last name, a Supervisor Corp ID associated with the RPA bot, a process ID associated with the RPA bot, and a native ID of the RPA bot.

3. The governance framework implementing system as claimed in claim 1, wherein the bot ID creator is to associate, with the created RPA bot ID, at least one of a bot login ID, an organization ID associated with the RPA bot, an employee type, a personnel number, a bot first name, a bot last name, and a Supervisor Corp ID associated with the RPA bot.

4. The governance framework implementing system as claimed in claim 1, wherein the AM is to provision birthright access for the RPA bot ID to the directory service account.

5. The governance framework implementing system as claimed in claim 1, wherein the PAPM is to initiate removal of RPA bot IDs associated with non-functional RPA bots and, for existing RPA bot IDs, periodically review access policies associated with each existing RPA bot ID.

6. The governance framework implementing system as claimed in claim 1, further comprises wherein the PAPM is to provide an instantaneous access key to the RPA bot for granting access.

7. A method comprising:
  receiving, for a robotic process automation (RPA) bot, an onboarding request for creating an RPA bot ID;
  creating the RPA bot ID, in response to validation of the onboarding request for approvals;
  associating a directory service account with the RPA bot ID, the directory service account being a privileged account available for bot employee type, wherein the associating the directory service account comprises creating the directory service account for the RPA bot ID in a predefined subdivisional organizational unit dedicatedly created for the bot employee type, the directory service account in the subdivisional organizational unit being tagged as the privileged account;
  linking a target account with the RPA bot ID to provision authorized privileged access of the target account to the RPA bot;
  providing an application programming interface (API) for the RPA bot for reconciling the access to the target account; and
  granting authorized privileged access to the RPA bot to the target account, based on the associating, the linking, and the reconciling, wherein the granting authorized privileged access comprises performing an audit to review access policies associated with the RPA bot to determine whether to grant access to the RPA bot.

8. The method as claimed in claim 7, wherein the onboarding request comprises at least one of a bot first name, a bot last name, a Supervisor Corp ID associated with the RPA bot, a process ID associated with the RPA bot, and a native ID of the RPA bot.

9. The method as claimed in claim 7, wherein the creating the RPA bot ID comprises associating with the created RPA bot ID at least one of a bot login ID, an organization ID associated with the RPA bot, an employee type, a personnel number, a bot first name, a bot last name, and a Supervisor Corp ID associated with the RPA bot.

10. The method as claimed 7, wherein the associating the directory service account comprises provisioning birthright access for the RPA bot ID to the directory service account.

11. The method as claimed in claim 7, further comprising reviewing RPA bot IDs to remove RPA bot IDs associated with non-functional RPA bots and, for existing RPA bot IDs, the reviewing comprising periodically assessing access policies associated with each existing RPA bot ID.

12. The method as claimed in claim 7, wherein the granting authorized privileged access further comprises providing an instantaneous access key to the RPA bot for granting access, in response to a successful review of the access policies.

13. A non-transitory computer readable medium including machine readable instructions that are executable by a processor to:
receive, for a robotic process automation (RPA) bot, an onboarding request for creating an RPA bot ID;
create the RPA bot ID, in response to validation of the onboarding request for approvals;
associate a directory service account with the RPA bot ID, the directory service account being a privileged account available for bot employee type, wherein the processor is to create the directory service account for the RPA bot ID in a predefined subdivisional organizational unit dedicatedly created for the bot employee type, the directory service account in the subdivisional organizational unit being tagged as the privileged account;
link a target account with the RPA bot ID to provision authorized privileged access of the target account to the RPA bot;
provide an application programming interface (API) for the RPA bot for reconciling the access to the target account; and
grant authorized privileged access to the RPA bot to the target account, based on the associating, the linking, and the reconciling, wherein the processor is to perform an audit to review access policies associated with the RPA bot to determine whether to grant authorized privileged access to the RPA bot.

14. The non-transitory computer readable medium as claimed in claim 13, wherein the processor is to associate with the created RPA bot ID at least one of a bot login ID, an organization ID associated with the RPA bot, an employee type, a personnel number, a bot first name, a bot last name, and Supervisor Corp ID associated with the RPA bot.

15. The non-transitory computer readable medium as claimed in claim 13, wherein the processor is to review RPA bot IDs to remove RPA bot IDs associated with non-functional RPA bots, wherein the reviewing comprises, for existing RPA bot IDs, periodically assessing access policies associated with each existing RPA bot ID.

16. The non-transitory computer readable medium as claimed in claim 13, wherein the granting authorized privileged access further comprises providing an instantaneous access key to the RPA bot for granting access, in response to a successful review of the access policies.

* * * * *